US011063403B2

(12) United States Patent
Hamamoto et al.

(10) Patent No.: US 11,063,403 B2
(45) Date of Patent: Jul. 13, 2021

(54) SOLID-STATE LASER DEVICE

(71) Applicant: MITSUBISHI HEAVY INDUSTRIES, LTD., Tokyo (JP)

(72) Inventors: Koichi Hamamoto, Tokyo (JP); Ryuichi Matsuda, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 126 days.

(21) Appl. No.: 15/751,258

(22) PCT Filed: Jan. 12, 2017

(86) PCT No.: PCT/JP2017/000796
§ 371 (c)(1),
(2) Date: Feb. 8, 2018

(87) PCT Pub. No.: WO2017/149944
PCT Pub. Date: Sep. 8, 2017

(65) Prior Publication Data
US 2018/0233874 A1 Aug. 16, 2018

(30) Foreign Application Priority Data

Feb. 29, 2016 (JP) ............................. JP2016-038298

(51) Int. Cl.
*H01S 3/04* (2006.01)
*H01S 3/042* (2006.01)
(Continued)

(52) U.S. Cl.
CPC ............ *H01S 3/0407* (2013.01); *H01S 3/027* (2013.01); *H01S 3/0401* (2013.01); *H01S 3/042* (2013.01);
(Continued)

(58) Field of Classification Search
CPC ...... H01S 3/0407; H01S 3/042; H01S 3/0404; H01S 3/0606; H01S 3/0615
See application file for complete search history.

(56) References Cited

U.S. PATENT DOCUMENTS 3,857,793 A * 12/1974 Pappalardo ........... H01S 3/2235
252/301.17
4,787,088 A * 11/1988 Horikawa ........... H01S 5/02296
359/509

(Continued)

FOREIGN PATENT DOCUMENTS

| JP | 2011-054675 | 3/2011 |
|----|-------------|--------|
| JP | 5330801     | 10/2013 |

(Continued)

OTHER PUBLICATIONS

Hiroaki Furuse et al., "Zenhansha Active Minor-gata Teion Reikyaku Yb: YAG Laser-Riso Kogen no Kaihatsu o Mezashite-", Laser Cross, May 2009, No. 254, pp. 1-2 (cited in the International Search Report and Written Opinion of the International Searching Authority of corresponding International Application No. PCT/JP2017/000796).

(Continued)

*Primary Examiner* — Tod T Van Roy
(74) *Attorney, Agent, or Firm* — Wenderoth, Lind & Ponack, L.L.P.

(57) ABSTRACT

A solid-state laser device includes an inner container, an outer container, a cooling medium supply unit, and a cover section. The inner container in which a laser medium is accommodated includes an inner light-transmitting unit. An outer light-transmitting unit of the outer container is provided at a part that faces the inner light-transmitting unit and is vacuum-insulated from the inner light-transmitting unit. The cooling medium supply unit supplies a cooling medium so that the cooling medium comes in contact with a surface (Continued)

other than a light input and output surface in the laser medium. The cover section partitions a light-passing area from a cooling medium supply area to which the cooling medium is supplied.

4 Claims, 13 Drawing Sheets

(51) Int. Cl.
  *H01S 3/06* (2006.01)
  *H01S 3/02* (2006.01)
  *H01S 3/16* (2006.01)
  *H01S 3/00* (2006.01)
  *H01S 3/23* (2006.01)

(52) U.S. Cl.
  CPC .......... *H01S 3/0604* (2013.01); *H01S 3/0612* (2013.01); *H01S 3/0615* (2013.01); *H01S 3/1618* (2013.01); *H01S 3/1643* (2013.01); *H01S 3/005* (2013.01); *H01S 3/025* (2013.01); *H01S 3/0405* (2013.01); *H01S 3/0621* (2013.01); *H01S 3/2316* (2013.01)

(56) References Cited

U.S. PATENT DOCUMENTS

| | | | | |
|---|---|---|---|---|
| 5,224,110 | A | * | 6/1993 | Hudson ................ H01S 3/1392 372/20 |
| 5,904,870 | A | * | 5/1999 | Fenner ................ H01S 3/0346 219/200 |
| 9,209,598 | B1 | * | 12/2015 | Reagan .................... H01S 5/024 |
| 2002/0122455 | A1 | * | 9/2002 | Knights ................ G02F 1/3532 372/108 |
| 2004/0052285 | A1 | * | 3/2004 | Matsui .................. H01S 3/0941 372/75 |
| 2009/0296199 | A1 | * | 12/2009 | Franjic .................... H01S 3/042 359/344 |
| 2010/0111121 | A1 | | 5/2010 | Takeshita et al. |
| 2018/0083408 | A1 | | 3/2018 | Matsuda et al. |

FOREIGN PATENT DOCUMENTS

| | | |
|---|---|---|
| JP | 2014-022568 | 2/2014 |
| JP | 5424320 | 2/2014 |
| JP | 2016-184668 | 10/2016 |

OTHER PUBLICATIONS

H. Furuse et al., "Zig-Zag active-minor laser with cryogenic $Yb^{3+}$:YAG/YAG composite ceramics", Opt. Express 19, Jan. 2011, pp. 2448-2455.

International Search Report dated Apr. 11, 2017 in International Application No. PCT/JP2017/000796, with English-language translation.

Written Opinion of the International Searching Authority dated Apr. 11, 2017 in International Application No. PCT/JP2017/000796, with English-language translation.

* cited by examiner

SOLID-STATE LASER DEVICE

TECHNICAL FIELD

The present invention relates to a solid-state laser device.
Priority is claimed on Japanese Patent Application No. 2016-038298, filed Feb. 29, 2016, the content of which is incorporated herein by reference.

BACKGROUND ART

For example, as a laser medium for a high-power solid-state laser device having a kilowatt-class average output, yttrium aluminum garnet (YAG) doped with ytterbium (Yb) and the like are known.

The temperature of such a laser medium increases as a laser output increases. However, for high efficiency, it is desirable for the temperature to be low at, for example, 120 K or less. Thus, in such a high-power solid-state laser, the laser medium is cooled using liquefied nitrogen or the like. However, since the laser medium is accommodated in a container, when the laser medium is cooled, a temperature difference between the inside and the outside of the container may occur and condensation may occur.

Patent Literature 1 proposes a technology in which a cooling medium container in which a laser medium and a cooling medium for cooling the laser medium flow is accommodated in a vacuum container, and particularly, condensation inside the container having a window is prevented.

In Patent Literature 1, a method of thinning a gain medium is additionally disclosed as a technology for effectively cooling the laser medium. However, in such a method, a coating for laser reflection is necessary, and thermal characteristics may deteriorate.

Patent Literature 2 proposes a structure in which a thinly formed gain medium is bonded to a transparent medium and laser light propagates according to total reflection.

CITATION LIST

Patent Literature

[Patent Literature 1]
    Japanese Patent No. 5424320
[Patent Literature 2]
    Japanese Patent No. 5330801

SUMMARY OF INVENTION

Technical Problem

The above-described laser medium is made of a brittle material such as glass, a single crystal, or a ceramic. Thus, in a method such as that of Patent Literature 2 in which laser light propagates according to total reflection, as in Patent Literature 1, when a cooling medium area in which a seal is directly brought into contact with a laser medium and the laser medium is cooled and a vacuum area are partitioned, a load may be applied to the laser medium and the laser medium may be damaged.

An object of the present invention is to provide a solid-state laser device through which it is possible to prevent damage to a laser medium and blockage of laser light, it is easy to replace the laser medium, and it is possible to cause laser oscillation with high efficiency.

Solution to Problem

According to a first aspect of the present invention, a solid-state laser device includes a laser medium, an inner container, an outer container, a cooling medium supply unit, and a cover section. The laser medium includes a light input and output surface on which at least one of incidence and emission of light occurs on a part of its surface. The inner container in which the laser medium is accommodated includes an inner light-transmitting unit configured to transmit incident light incident on the light input and output surface and emission light emitted from the light input and output surface. The outer container in which the inner container is accommodated, and which includes at least an outer light-transmitting unit provided at a part that faces the inner light-transmitting unit, transmitting the incident light and the emission light, and being vacuum-insulated from the inner light-transmitting unit. The cooling medium supply unit supplies a cooling medium inside the inner container so that the cooling medium comes in contact with at least a part of a surface other than the light input and output surface in the laser medium. The cover section partitions a light-passing area through which the incident light and the emission light between the light input and output surface and the inner light-transmitting unit pass from a cooling medium supply area to which the cooling medium is supplied from the cooling medium supply unit.

When the inner light-transmitting unit and the outer light-transmitting unit are vacuum-insulated, even if the laser medium is cooled by the cooling medium without disposing the laser medium in a vacuum atmosphere, it is possible to prevent the occurrence of a temperature difference between inner and outer surfaces of the inner light-transmitting unit and a temperature difference between inner and outer surfaces of the outer light-transmitting unit. Therefore, it is possible to prevent the occurrence of condensation on the inner light-transmitting unit and the outer light-transmitting unit. Further, it is not necessary to dispose the laser medium in a vacuum atmosphere and it is possible to set the light-passing area and the cooling medium supply area under the same pressure. Therefore, it is not necessary to press the cover section against the laser medium and it is possible to reduce a load on the laser medium. In addition, when the light-passing area and the cooling medium supply area are set under the same pressure, there is no need to firmly fix the laser medium. Further, since it is possible to supply the cooling medium such that the cooling medium directly comes in contact with at least a part of a surface other than the light input and output surface, it is possible to efficiently cool the laser medium.

As a result, it is possible to prevent damage to the laser medium and blockage of laser light, it is easy to replace the laser medium, and it is possible to cause laser oscillation with high efficiency.

According to a second aspect of the present invention, the light input and output surface according to the first aspect may be an inclined surface facing downward that is disposed gradually outward from the lower side to the upper side. The cooling medium supply unit may inject a cooling medium to the laser medium in a vertical direction.

In such a configuration, droplets of the cooling medium easily fall from the upper end of the inclined surface. Accordingly, even if it is not possible to prevent movement of the cooling medium by the cover section, it is possible to reduce droplets of the cooling medium that move along the inclined surface of the light input and output surface. As a result, it is possible to prevent light from being blocked by the cooling medium.

According to a third aspect of the present invention, the cooling medium supply unit according to the first or second aspect may inject the cooling medium to the laser medium in a horizontal direction.

In such a configuration, the laser medium can have a shape that is easy to handle so that excitation light and laser output light propagate in a horizontal plane. Further, when the cooling medium is injected to the laser medium in a horizontal direction, it is possible to prevent droplets of the cooling medium from sneaking to the light input and output surface. As a result, it is possible to prevent laser light from being blocked by the cooling medium.

According to a fourth aspect of the present invention, the cover section according to any one of the first to third aspects may include a support part supporting the laser medium.

In such a configuration, since the laser medium can be supported by the support part of the cover section, it is possible to further reduce the number of components than in a case in which the cover section and the support part supporting the laser medium are individually provided. Moreover, it is possible to increase a degree of freedom of disposition of the cover section.

According to a fifth aspect of the present invention, the solid-state laser device according to any one of the first to fourth aspects may include a trap part that is provided inside the inner container and collects a volatile component contained in an atmosphere inside the inner container.

In such a configuration, even if a small amount of volatile component and the like remain inside the inner container, the volatile component can be collected before it adheres to the inner light-transmitting unit and the laser medium. As a result, it is possible to prevent the occurrence of condensation due to the volatile component.

According to a sixth aspect of the present invention, the solid-state laser device according to any one of the first to fifth aspects may include a heating unit that is capable of heating at least one of the inner light-transmitting unit and the light input and output surface.

In such a configuration, since it is possible to increase the temperature of the inner light-transmitting unit and the light input and output surface of the laser medium, it is possible to condense the volatile component in advance at a part with a relatively low temperature inside the inner container. As a result, it is possible to prevent condensation of the volatile component on the laser medium and the inner light-transmitting unit.

According to a seventh aspect of the present invention, the inner container according to the sixth aspect may be a vacuum container that is capable of being vacuumized.

In such a configuration, it is possible to vacuumize the inside of the inner container and reduce the volatile component remaining inside the inner container. As a result, additionally, it is possible to prevent the volatile component remaining inside the inner container from adhering to the light input and output surface and the inner light-transmitting unit.

Advantageous Effects of Invention

According to the solid-state laser device, it is possible to prevent damage to a laser medium and blockage of laser light, it is easy to replace the laser medium, and it is possible to cause laser oscillation with high efficiency.

DESCRIPTION OF EMBODIMENTS

First Embodiment

Next, a solid-state laser device in a first embodiment of the present invention will be described.

Figure 1:
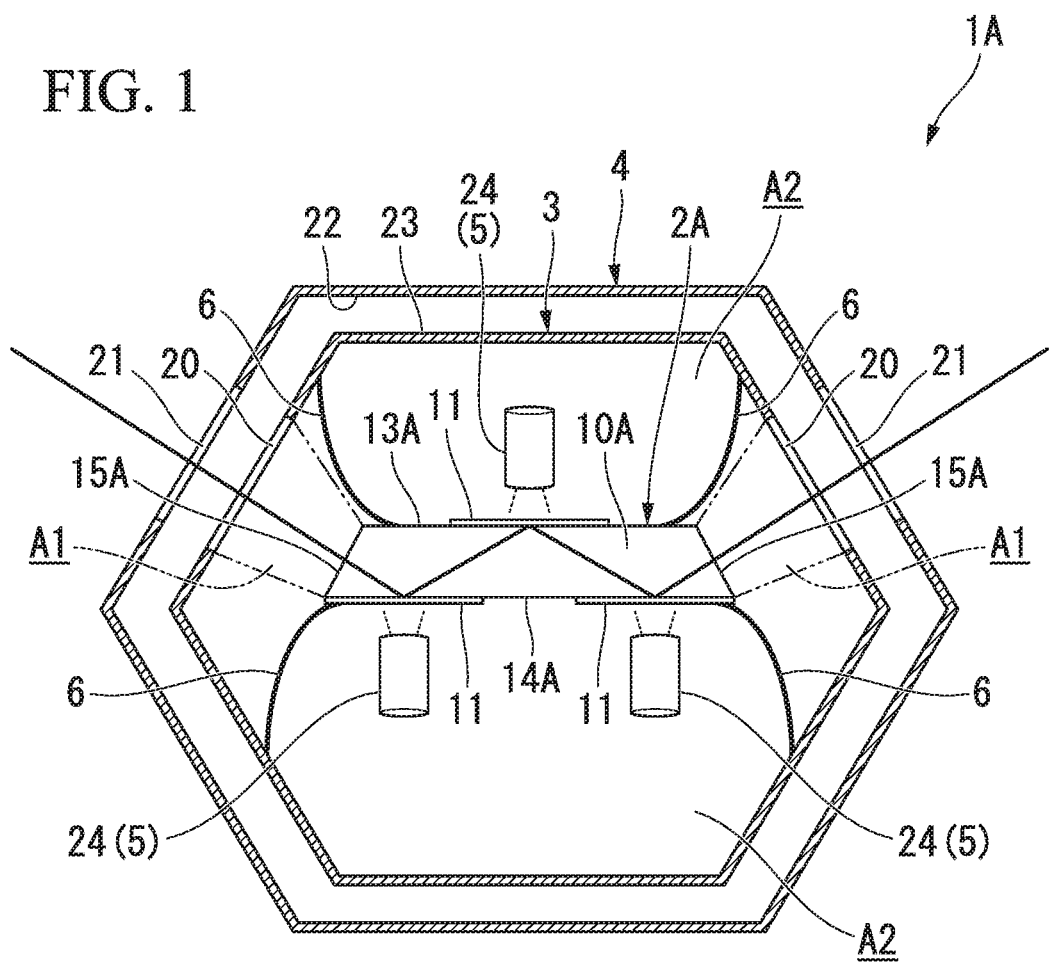
FIG. 1 is a diagram, which is viewed in a horizontal direction, showing a schematic configuration of a solid-state laser device in a first embodiment of the present invention.
Figure 2:
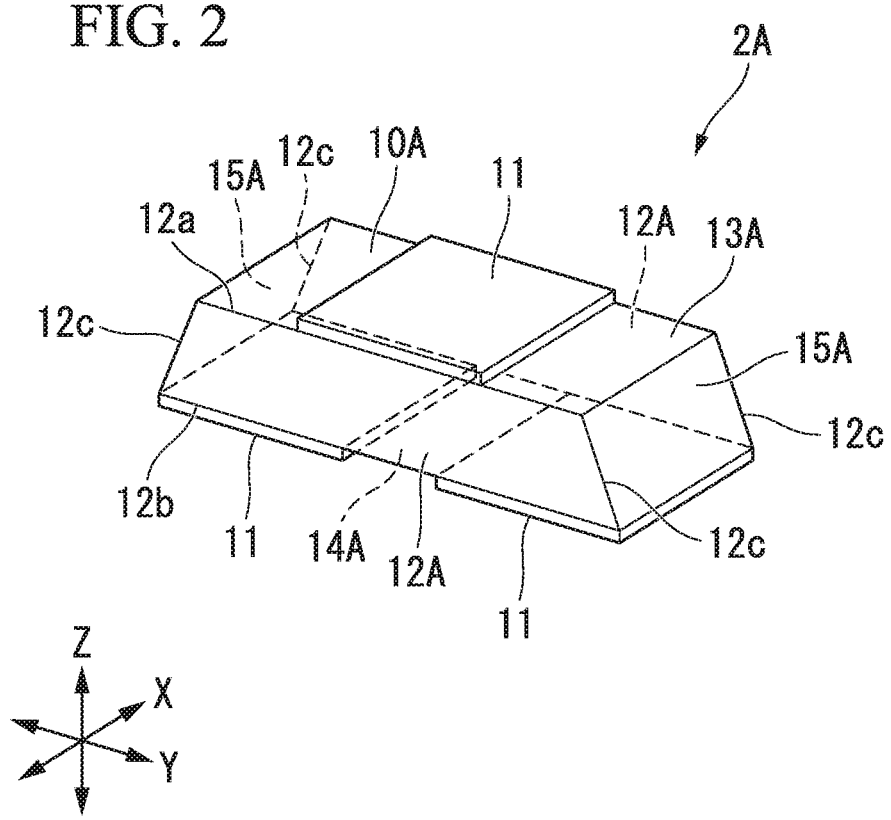
FIG. 2 is a perspective view of a laser medium of the solid-state laser device.

FIG. 1 is a diagram showing a schematic configuration of the solid-state laser device in the first embodiment of the present invention. FIG. 2 is a perspective view of a laser medium of the solid-state laser device.

As the solid-state laser device in the first embodiment, a solid-state laser device in which yttrium aluminum garnet (hereinafter simply referred to as YAG) doped with ytterbium (hereinafter simply referred to as Yb) as an active element is used as a gain medium will be exemplified. However, the present invention is not limited to the solid-state laser device using the gain medium or a base material which is YAG (hereinafter this similarly applies to modified examples and second to sixth embodiments).

As shown in FIG. 1, a solid-state laser device 1A of the first embodiment mainly includes a laser medium 2A, an inner container 3, an outer container 4, a cooling medium supply unit 5, and a cover section 6.

The laser medium 2A includes a transparent part 10A and a gain medium 11. The laser medium 2A has a light input and output surface in which at least one of incidence of excitation light on the transparent part 10A and emission of laser light obtained by amplifying excitation light occurs on a part of its surface.

The transparent part 10A is made of YAG or the like that is not doped with an active element. A ceramic material, that can be enlarged, can be used as the transparent part 10A. When such a ceramic material is used, it is possible to widen an excitation area and excitation light with a high light intensity can be absorbed on the gain medium 11.

As shown in FIG. 2, the transparent part 10A includes two side surfaces 12A, an upper surface 13A, a bottom surface 14A, and two incidence and emission surfaces (light input and output surface) 15A.

The two side surfaces 12A are formed parallel to a YZ plane. The two side surfaces 12A are formed in the same trapezoidal shape. These side surfaces 12A are disposed in an overlapping manner when viewed in an X direction. An upper side 12a and a lower side 12b of the side surface 12A formed in the trapezoidal shape extend in a Y direction and center positions in a lengthwise direction are coincident with each other in the Y direction. In addition, two hypotenuses 12c of the side surface 12A formed in a trapezoidal shape connect ends of the upper side 12a and the lower side 12b.

The upper surface 13A connects the upper sides 12a of the two side surfaces 12A. The bottom surface 14A connects the lower sides 12b of the two side surfaces 12A. The upper surface 13A and the bottom surface 14A are formed in a plane parallel to an XY plane.

The incidence and emission surface 15A connects the hypotenuses 12c adjacent to each other in the X direction. The incidence and emission surface 15A is formed in a plane inclined to approach the center position of the upper side 12a in the lengthwise direction toward the upper side 12a from the lower side 12b. The incidence and emission surface 15A is a light input and output surface in which at least one of incidence of the above-described excitation light and emission of laser light obtained by amplifying excitation light occurs. An inclination angle of the incidence and emission surface 15A is set so that reflection of the excitation light or the laser light is reduced.

A plurality of gain mediums 11 are provided. These gain mediums 11 are bonded to the upper surface 13A and the bottom surface 14A of the transparent part 10A. This embodiment exemplifies a case in which one gain medium 11 is provided on the upper surface 13A and two gain mediums 11 are provided on the bottom surface 14A. These gain mediums 11 are formed in a thin flat plate shape. The gain mediums 11 are made of YAG doped with Yb as an active element. The gain mediums 11 bonded to the bottom surface 14A are disposed with an interval in the Y direction. The gain medium 11 bonded to the bottom surface 14A is disposed at both ends of the bottom surface 14A in the Y direction. The gain medium 11 bonded to the upper surface 13A is disposed at the center of the upper surface 13A in the Y direction. The gain medium 11 in an example of this embodiment is formed in a rectangular plate shape having the same width as the transparent part 10A in the X direction.

According to the above-described laser medium 2A, excitation light and laser light incident from the incidence and emission surface 15A of any one of the two incidence and emission surfaces 15A are totally reflected by the gain medium 11, form a zigzag optical path (refer to FIG. 1), and are emitted from the other incidence and emission surface 15A. Here, excitation light is incident from an excitation light source (not shown). When laser light obtained by amplifying excitation light is incident from the incidence and emission surface 15A, for example, it is emitted from the laser medium 2A, then reflected by a high reflection mirror or the like, and is incident on the same incidence and emission surface 15A where the excitation light and laser light is emitted.

As shown in FIG. 1, the laser medium 2A is accommodated in the inner container 3. The inner container 3 has an inner window (inner light-transmitting unit) 20 that can transmit incident light (for example, excitation light and laser light) incident on the incidence and emission surface 15A of the laser medium 2A and emission light (for example, laser light) emitted from the incidence and emission surface 15A. The incident light enters the inside of the inner container 3 in which the laser medium 2A is provided from the outside of the inner container 3 through the inner window 20. The emission light is emitted from the inside of the inner container 3 to the outside through the inner window 20. As the inner container 3 of this embodiment, one in which two inner windows 20 are provided is exemplified. These inner windows 20 are disposed one by one at positions at which excitation light and laser light can be incident or emitted from the two incidence and emission surfaces 15A. In FIG. 1, an optical axis of excitation light and laser light that pass through the inner window 20 is indicated by a solid line (hereinafter this similarly applies to an optical axis that passes through the outer container 4).

The inner container 3 is accommodated in the outer container 4. The outer container 4 includes an outer window (outer light-transmitting unit) 21 at a part that faces the inner window 20. An inner surface 22 of the outer container 4 is disposed at a position at a predetermined distance from an outer surface 23 of the inner container 3. In addition, the outer container 4 in this embodiment is a vacuum container in which the inner container 3 is accommodated, and a vacuum atmosphere is formed between the outer container 4 and the inner container 3. That is, the outer container 4 is vacuum-insulated from the inner container 3. Thus, a gap between the inner window 20 of the inner container 3 and the outer window 21 of the outer container 4 is vacuum-insulated. The outer window 21 can transmit incident light and emission light, and light that passes through the inner window 20 similarly passes through the outer window 21. The inner container 3 may be supported by, for example, a support part (not shown) supporting the bottom of the container from below. In addition, it may be supported from the side of the container or from above.

Here, for example, an antireflection coating for preventing reflection of excitation light and laser light may be formed on the inner window 20 and the outer window 21. The inner window 20 and the outer window 21 may be disposed to have an incident angle (Brewster's angle) at which reflection loss with respect to the optical axis of excitation light and laser light is minimized.

The cooling medium supply unit 5 supplies a cooling medium such as liquefied nitrogen into the inner container 3 so that the cooling medium comes in contact with at least a part of a surface other than the incidence and emission surface 15A in the laser medium 2A. The cooling medium supply unit 5 in this embodiment includes a plurality of nozzles 24 through which a cooling medium is sprayed to the above-described plurality of gain mediums 11. In this embodiment, a case in which one nozzle 24 is provided with respect to one gain medium 11 is exemplified. A cooling medium is sprayed to the gain mediums 11 bonded to the bottom surface 14A of the transparent part 10A upward from below through these nozzles 24. Additionally, a cooling medium is sprayed to the gain medium 11 bonded to the upper surface 13A of the transparent part 10A downward from above through the nozzles 24. In this manner, when a cooling medium is sprayed through the nozzle 24, it is possible to perform cooling in the same manner as in impingement cooling. As a result, it is possible to cool the gain medium 11 efficiently.

The cover section 6 partitions a light-passing area (in FIG. 1, an area surrounded by a two-dot chain line) A1 through which incident light and emission light between the incidence and emission surface 15A and the inner window 20 pass from a cooling medium supply area A2 (in FIG. 1, an area excluding the area surrounded by a two-dot chain line) to which a cooling medium is supplied from the cooling medium supply unit 5. That is, the cover section 6 partitions an internal space of the inner container 3 so that the cooling medium supplied into the inner container 3 from the cooling medium supply unit 5 does not come in contact with the incidence and emission surface 15A. The cover section 6 is fixed to the laser medium 2A through a seal or the like.

For example, the laser medium 2A in this embodiment is supported on the inner container 3 through a support member (not shown) in the cooling medium supply area A2. That is, the support member (not shown) does not block excitation light and laser light.

Figure 3:
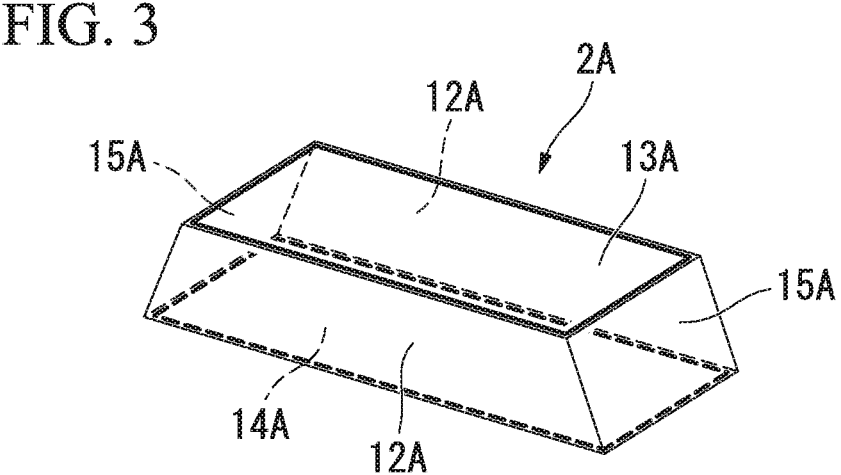
FIG. 3 is a perspective view showing a fixing part of a support member in the first embodiment.

FIG. 3 is a perspective view showing a fixing part of the support member in the first embodiment.

In FIG. 3, the fixing part of the support member (not shown) is indicated by bold lines (a solid line and a dashed line). Here, in FIG. 3, the gain medium 11 is not shown.

As shown in FIG. 3, the support member in this embodiment is fixed to the laser medium 2A along the circumference of the upper surface 13A. In addition, the support member is fixed to the laser medium 2A along the circumference of the bottom surface 14A.

The cover section 6 prevents the cooling medium from coming in contact with the incidence and emission surface 15A.

As shown in FIG. 1, the cover section 6 is disposed to rise upward from the upper surface 13A near the light-passing area A1 and disposed to hang downward from the bottom surface 14A (or the gain medium 11) near the light-passing area A1. A rising length and a hanging length of the cover section 6 may be set according to spray momentum of the cooling medium. For example, one end of the cover section 6 may be fixed to the laser medium 2A and the other end may be fixed to an inner surface 25 of the inner container 3.

Next, an operation method of the above-described solid-state laser device 1A will be described with reference to the drawing.

Figure 4:
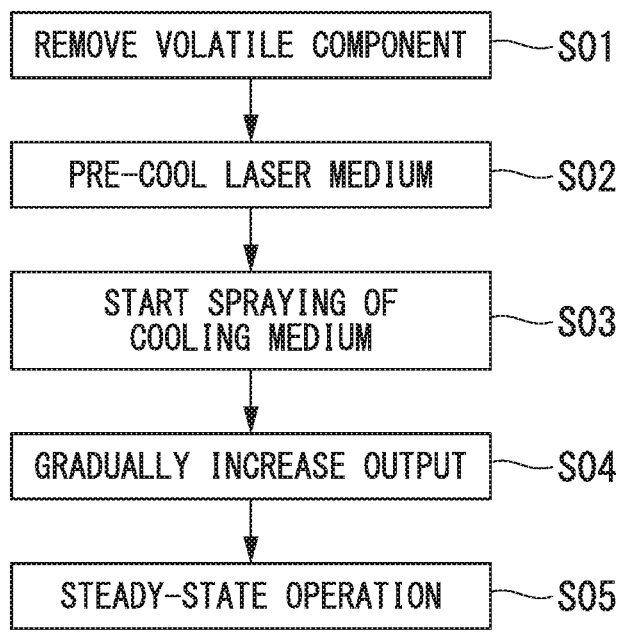
FIG. 4 is a flowchart of an operation method of the solid-state laser device in the first embodiment of the present invention.

FIG. 4 is a flowchart of an operation method of the solid-state laser device in the first embodiment of the present invention.

As shown in FIG. 4, first, a process of removing a volatile component such as water (for example, water vapor) inside the inner container 3 is performed (Step S01).

In order to remove a volatile component inside the inner container 3, the inside of the inner container 3 is purged with a dried gas, and thus the volatile component can be removed. The dried gas may be, for example, a gas from which water is removed in advance by a cold trap or the like. In order to remove the volatile component inside the inner container 3, the inner container 3 can be a vacuum container. In this manner, when the inner container 3 is a vacuum container, it is effective to perform purging with a dried gas after the inner container 3 is temporarily in a vacuum state.

Further, so-called baking through which the inner container 3 is heated while the inside of the inner container 3 is vacuumized by a vacuum pump (not shown) may be performed. In this manner, when baking of the inner container 3 is performed, a volatile component attached to the inner surface of the inner container 3 can be vaporized and the vaporized volatile component can be discharged to the outside of the inner container 3 by the vacuum pump (not shown). As a result, a volatile component such as water remaining inside the inner container 3 can be additionally removed. While water removal has been exemplified as volatile component removal, a volatile component other than water (for example, oil) can be similarly removed.

Next, a pre-cooling process of cooling the laser medium 2A in advance before excitation light enters is performed (Step S02). In the pre-cooling process, for example, when a liquid cooling medium is injected into the inner container 3 and the laser medium 2A disposed inside the inner container 3 is immersed in the cooling medium, the laser medium 2A can be uniformly pre-cooled. The cooling medium in which the laser medium 2A is immersed pre-cools the laser medium 2A and is then discharged from the inner container 3 through a drain (not shown).

Then, the nozzle 24 starts to spray the cooling medium and the laser medium 2A is sufficiently cooled (Step S03). In addition, while the laser medium 2A is sufficiently cooled, incidence of excitation light on the laser medium 2A starts, an output thereof is gradually increased (Step S04), and the process proceeds to a steady-state operation (Step S05).

According to the above-described first embodiment, when the inner window 20 and the outer window 21 are vacuum-insulated, even if the laser medium 2A is cooled by the cooling medium without disposing the laser medium 2A in a vacuum atmosphere, it is possible to prevent the occurrence of a temperature difference between inner and outer surfaces of the inner window 20 and a temperature difference between inner and outer surfaces of the outer window 21. Therefore, it is possible to prevent the occurrence of condensation on the inner window 20 and the outer window 21.

Further, it is not necessary to dispose the laser medium 2A in a vacuum atmosphere, and it is possible to set the light-passing area A1 and the cooling medium supply area A2 under the same pressure. Therefore, it is not necessary to press the cover section 6 against the laser medium 2A and it is possible to reduce a load on the laser medium. Thus, it is possible to reduce deformation and damage to the laser medium 2A.

In addition, when the light-passing area A1 and the cooling medium supply area A2 are set to be under the same pressure, there is no need to firmly position and fix the laser medium 2A.

Further, since it is possible to supply the cooling medium such that the cooling medium directly comes in contact with the surface of the laser medium 2A other than the incidence and emission surface 15A, which is a light input and output surface, it is possible to efficiently cool the laser medium.

First Modified Example of First Embodiment

A case in which the support member (not shown) supporting the laser medium 2A is fixed to the laser medium 2A at a fixing position shown in FIG. 3 has been described in the above-described first embodiment. However, the fixing position of the support member is not limited to the fixing position in the above-described first embodiment.

Figure 5:
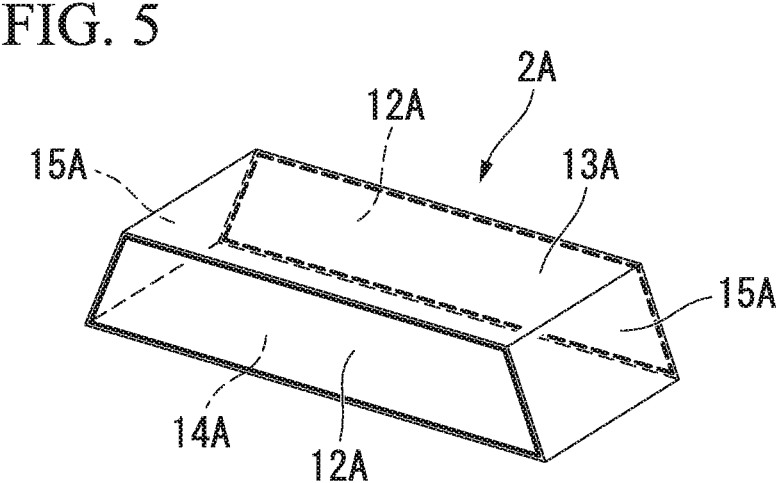
FIG. 5 is a perspective view corresponding to FIG. 3 in a first modified example of the first embodiment of the present invention.

FIG. 5 is a perspective view corresponding to FIG. 3 in a first modified example of the first embodiment of the present invention.

For example, as shown in FIG. 5, the support member (not shown) supporting the laser medium 2A may be fixed along peripheral parts of the two side surfaces 12A. Accordingly, the incidence and emission surface 15A, which is a light input and output surface, is not blocked and an installation space for the gain medium is not reduced. Further, since a part which forms a trapezoidal end of the laser medium 2A in a side view becomes tapered, the strength becomes relatively lower. However, since a load is not concentrated on the part which forms a trapezoidal end, it is possible to further reduce a load on the part which forms a trapezoidal end.

Second Modified Example of First Embodiment

Figure 6:
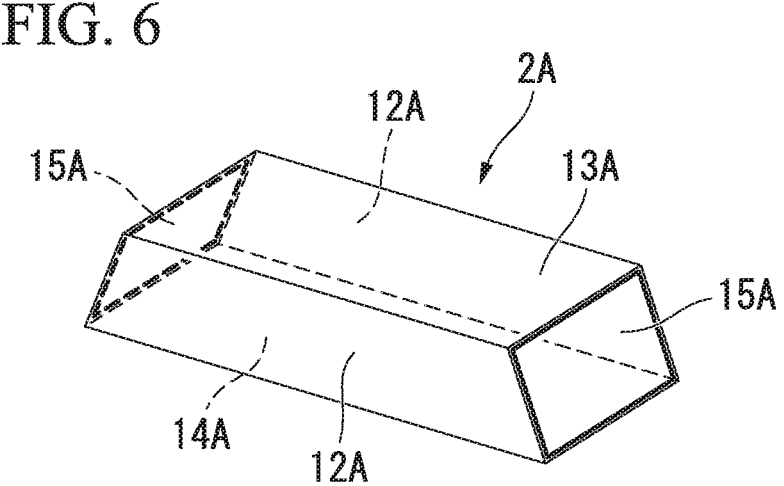
FIG. 6 is a perspective view corresponding to FIG. 3 in a second modified example of the first embodiment of the present invention.

FIG. 6 is a perspective view corresponding to FIG. 3 in a second modified example of the first embodiment of the present invention.

For example, as shown in FIG. 6, the support member (not shown) supporting the laser medium 2A may be fixed along peripheral parts of two incidence and emission surfaces. Accordingly, it is possible to increase a surface area of the laser medium 2A that can be directly cooled by the cooling medium and an installation space for the gain medium is not reduced.

Third Modified Example of First Embodiment

Figure 7:
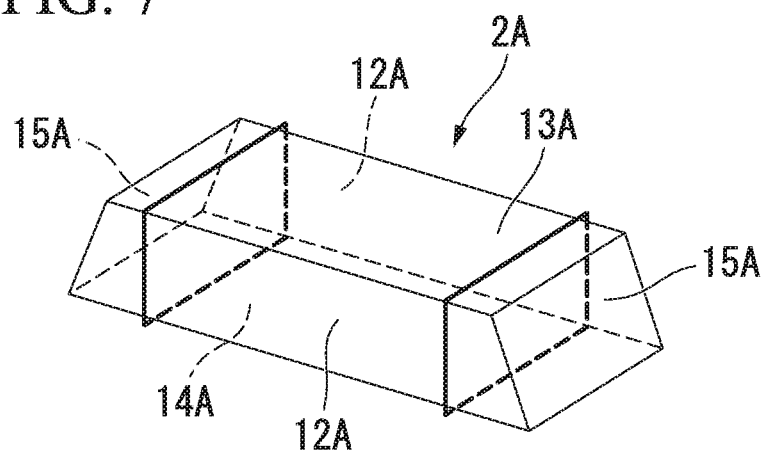
FIG. 7 is a perspective view corresponding to FIG. 3 in a third modified example of the first embodiment of the present invention.

FIG. 7 is a perspective view corresponding to FIG. 3 in a third modified example of the first embodiment of the present invention.

For example, as shown in FIG. 7, the support member (not shown) supporting the laser medium 2A may be fixed to a part (rectangular annular part) intersecting a vertical plane perpendicular to both the upper surface 13A and the bottom surface 14A at a position closer to the center than the two incidence and emission surfaces 15A. Accordingly, additionally, it is possible to further reduce a load applied to a part which forms a trapezoidal end of the laser medium 2A in a side view without blocking the incidence and emission surface 15A, which is a light input and output surface.

Fourth Modified Example of First Embodiment

Figure 8:
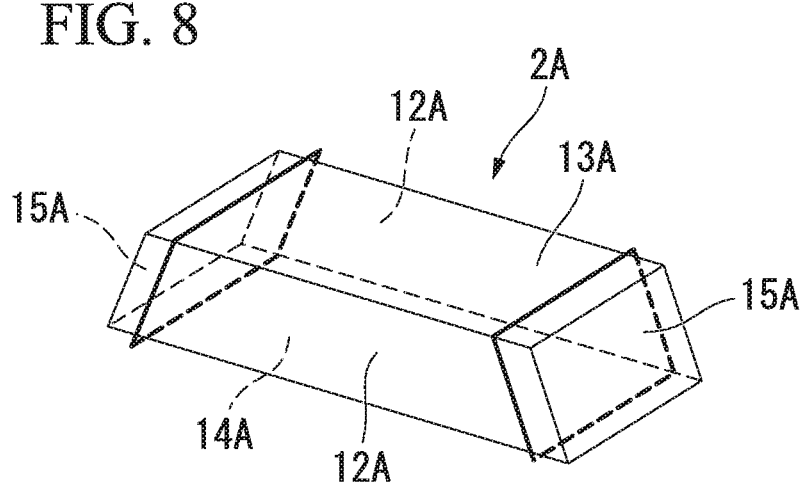
FIG. 8 is a perspective view corresponding to FIG. 3 in a fourth modified example of the first embodiment of the present invention.

FIG. 8 is a perspective view corresponding to FIG. 3 in a fourth modified example of the first embodiment of the present invention.

For example, as shown in FIG. 8, the support member (not shown) supporting the laser medium 2A may be fixed to a part (rectangular annular part) intersecting a plane parallel to the incidence and emission surface 15A at a position closer to the center than the two incidence and emission surfaces 15A. Accordingly, it is possible to further increase a surface area of the laser medium 2A that can be directly cooled by the cooling medium than in the third modified example. Further, the incidence and emission surface 15A, which is a light input and output surface, is not blocked.

Fifth Modified Example of First Embodiment

Figure 9:
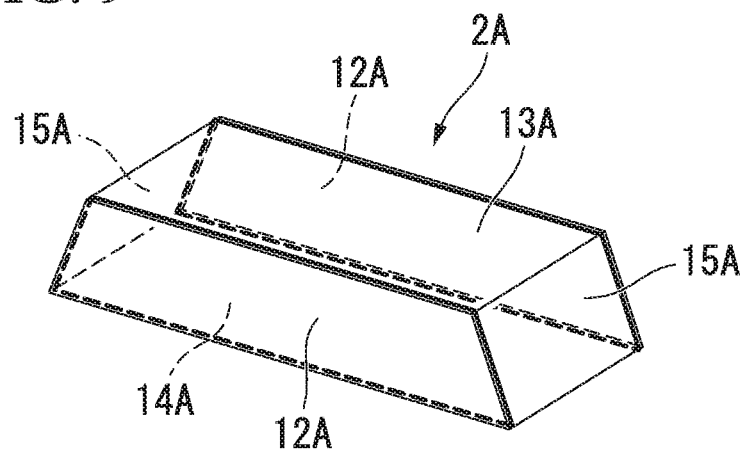
FIG. 9 is a perspective view corresponding to FIG. 3 in a fifth modified example of the first embodiment of the present invention.

FIG. 9 is a perspective view corresponding to FIG. 3 in a fifth modified example of the first embodiment of the present invention.

For example, as shown in FIG. 9, the support member (not shown) supporting the laser medium 2A may be fixed to a part (trapezoid annular part) intersecting a plane parallel to the side surface 12A in the vicinity of the two side surfaces 12A. Accordingly, it is possible to further reduce a load applied to a part which forms a trapezoidal end of the laser medium 2A in a side view than in the second modified example.

Sixth Modified Example of First Embodiment

Figure 10:
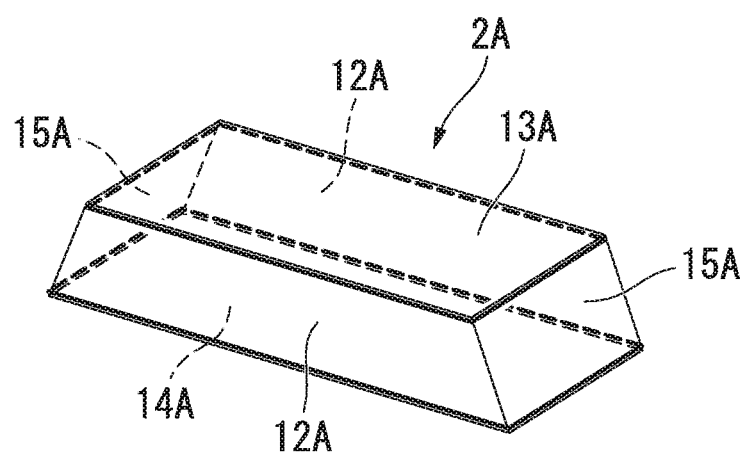
FIG. 10 is a perspective view corresponding to FIG. 3 in a sixth modified example of the first embodiment of the present invention.

FIG. 10 is a perspective view corresponding to FIG. 3 in a sixth modified example of the first embodiment of the present invention.

For example, as shown in FIG. 10, the support member (not shown) supporting the laser medium 2A may be fixed to a part (a large and small annular part) intersecting a plane parallel to the upper surface 13A and the bottom surface 14A in the vicinities of the upper surface 13A and the bottom surface 14A. Accordingly, particularly, there are advantages in that attachment of the cover section 6 is not interfered with and it is possible to ensure a wide installation space for the gain medium 11.

A fixing part of the support member to the laser medium 2A is not limited to the fixing parts in the above-described first embodiment and modified examples. For example, such fixing parts may be used in combination appropriately.

Second Embodiment

Next, a solid-state laser device of a second embodiment of the present invention will be described with reference to the drawing. The only difference between the solid-state laser device of the second embodiment and the solid-state laser device of the above-described first embodiment is a direction of the laser medium. Therefore, the same parts are denoted by the same reference numerals for description and redundant descriptions thereof are omitted.

Figure 11:
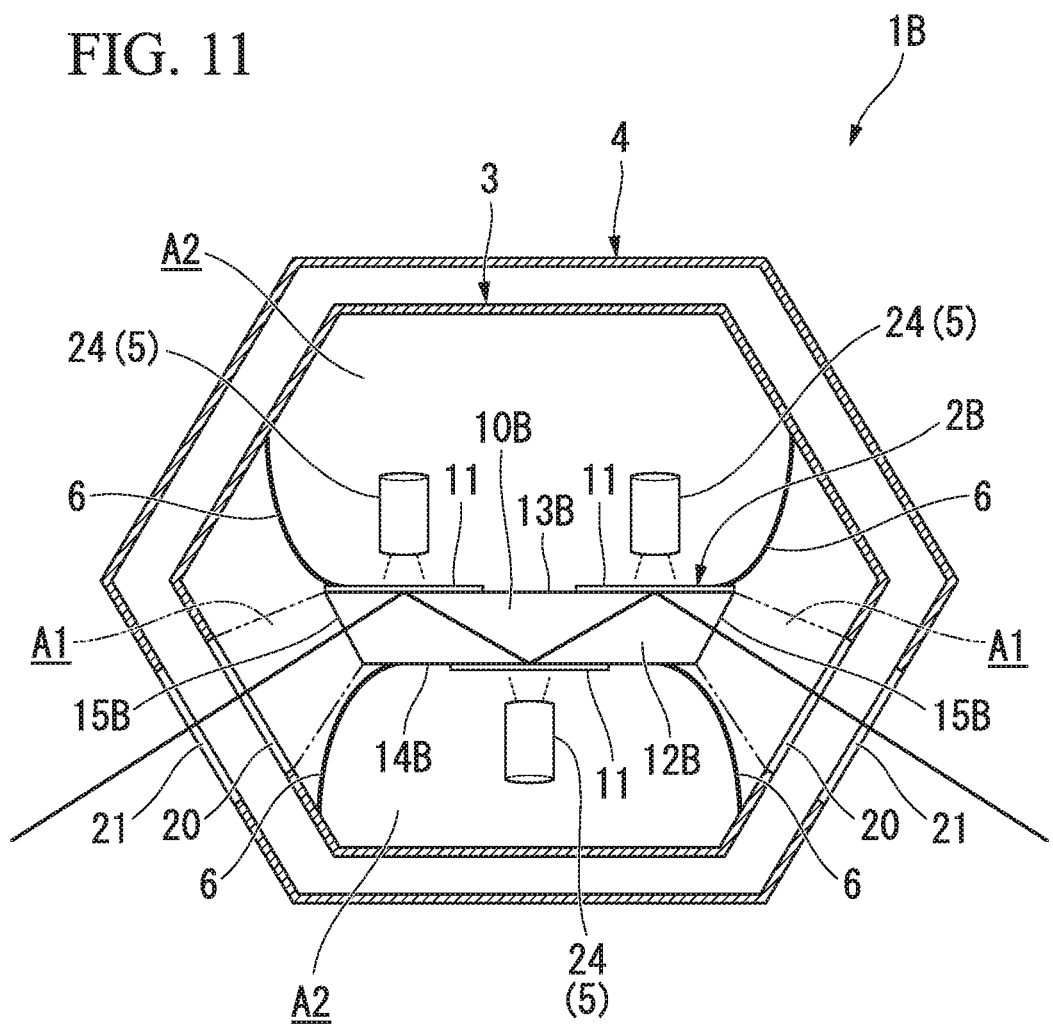
FIG. 11 is a diagram corresponding to FIG. 1 in a solid-state laser device in a second embodiment of the present invention.

FIG. 11 is a diagram corresponding to FIG. 1 in the solid-state laser device in the second embodiment of the present invention.

As shown in FIG. 11, a solid-state laser device 1B of the second embodiment mainly includes a laser medium 2B, the inner container 3, the outer container 4, the cooling medium supply unit 5, and the cover section 6.

The laser medium 2B includes a transparent part 10B and the gain medium 11.

The transparent part 10B is made of YAG that is not doped with an active element or the like similarly to the transparent part 10A of the first embodiment. The transparent part 10B includes two side surfaces 12B, an upper surface 13B, a bottom surface 14B, and two incidence and emission surfaces (light input and output surfaces) 15B. The transparent part 10B is vertically inverted compared to the transparent part 10A of the above-described first embodiment. That is, the two side surfaces 12B are formed in an inverted trapezoidal shape and the upper surface 13B is formed longer than the bottom surface 14B.

The two incidence and emission surfaces 15B are inclined planes facing downward that are disposed gradually outward from the lower side to the upper side.

Similarly to the first embodiment, in the transparent part 10B in the second embodiment, the gain medium 11 is bonded to the center of the upper surface 13B and both ends of the bottom surface 14B. The nozzles 24 of the cooling medium supply unit 5 are disposed at positions at which a cooling medium can be sprayed to the gain medium 11. More specifically, the cooling medium supply unit 5 includes two nozzles 24 through which a cooling medium is sprayed from the upper side to the lower side of the laser medium 2B and one nozzle 24 through which a cooling medium is sprayed from the lower side to the upper side of the laser medium 2B.

Similarly to the first embodiment, the cover section 6 partitions a light-passing area (in FIG. 11, an area surrounded by a two-dot chain line) A1 through which incident light and emission light between the incidence and emission surface 15B and the inner window 20 pass from a cooling medium supply area A2 (in FIG. 11, an area excluding the area surrounded by the two-dot chain line) to which a cooling medium is supplied from the cooling medium supply unit 5.

According to the above-described second embodiment, since the incidence and emission surface 15B is inclined downward, droplets of the cooling medium easily fall from the upper end of the incidence and emission surface 15B. Therefore, even if it is not possible to prevent movement of the cooling medium by the cover section 6, it is possible to reduce droplets of the cooling medium that move along the incidence and emission surface 15B, which is a light input and output surface. As a result, it is possible to prevent excitation light and laser light that pass through the light-passing area from being blocked by the cooling medium.

Third Embodiment

Next, a solid-state laser device of a third embodiment of the present invention will be described with reference to the drawing. The only difference between the solid-state laser device of the third embodiment and the solid-state laser device of the above-described first embodiment is a direction in which a cooling medium is injected. Therefore, the same parts as in the first embodiment are denoted by the same reference numerals for description and redundant descriptions thereof are omitted.

Figure 12:
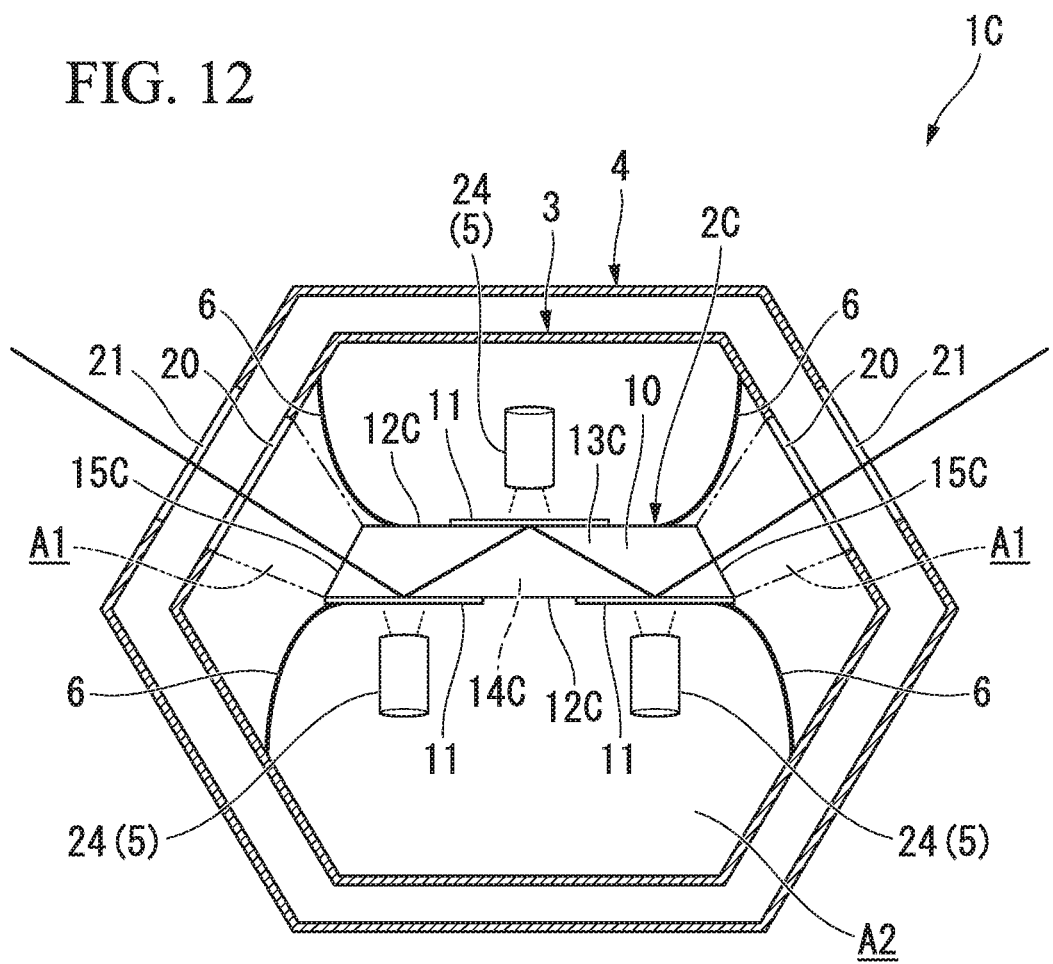
FIG. 12 is a diagram, which is viewed in a vertical direction, corresponding to FIG. 1 in a solid-state laser device in a third embodiment of the present invention.

FIG. 12 is a diagram corresponding to FIG. 1 in the solid-state laser device in the third embodiment of the present invention.

As shown in FIG. 12, in a solid-state laser device 1C in the third embodiment, a spray direction of the cooling medium in the solid-state laser device 1A of the first embodiment is changed from a vertical direction to a horizontal direction, and an orientation of the laser medium is changed by 90 degrees according to a change in the spray direction. That is, in a laser medium 2C of this embodiment, two trapezoidal surfaces are an upper surface 13C and a bottom surface 14C. Further, incidence and emission surfaces 15C of the laser medium 2C are inclined in the horizontal direction. In the laser medium 2C, the gain medium 11 is bonded to two side surfaces 12C with different sizes similarly to the upper surface 13A and the bottom surface 14A of the above-described laser medium 2A.

According to the above-described third embodiment, when the laser medium 2C has a shape that is easy to handle so that excitation light and laser light propagate in a horizontal plane and the cooling medium is injected in a direction horizontal to the laser medium 2C, it is possible to prevent droplets of the cooling medium from sneaking to the incidence and emission surface 15C. As a result, similarly to the second embodiment, it is possible to prevent laser light from being blocked by the cooling medium.

Fourth Embodiment

Next, a solid-state laser device of a fourth embodiment of the present invention will be described with reference to the drawing. The only difference between the solid-state laser device of the fourth embodiment and the solid-state laser device of the above-described first embodiment is a configuration of a cover member. Therefore, the same parts as in the first embodiment are denoted by the same reference numerals for description and redundant descriptions thereof are omitted.

Figure 13:
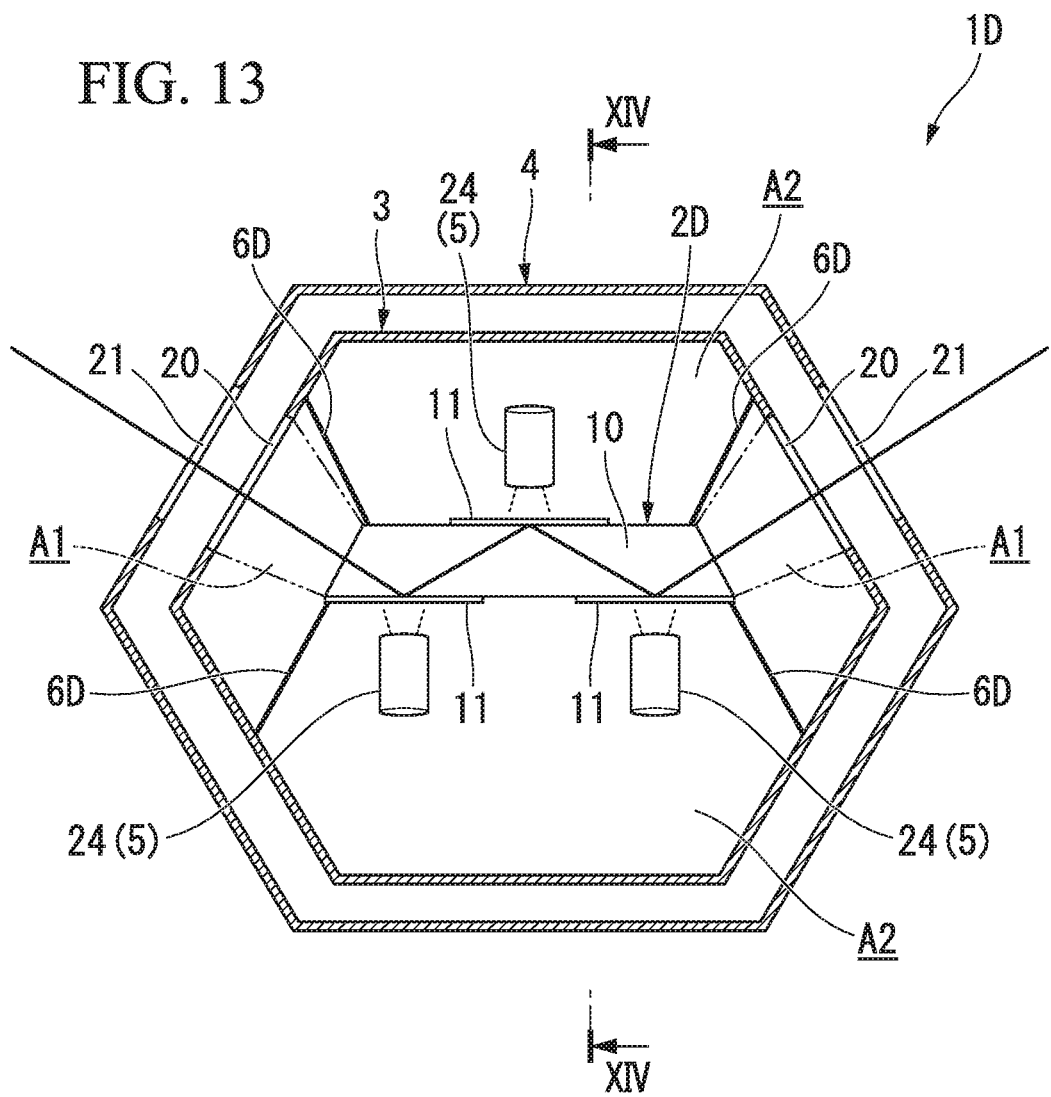
FIG. 13 is a diagram corresponding to FIG. 1 in a solid-state laser device in a fourth embodiment of the present invention.
Figure 14:
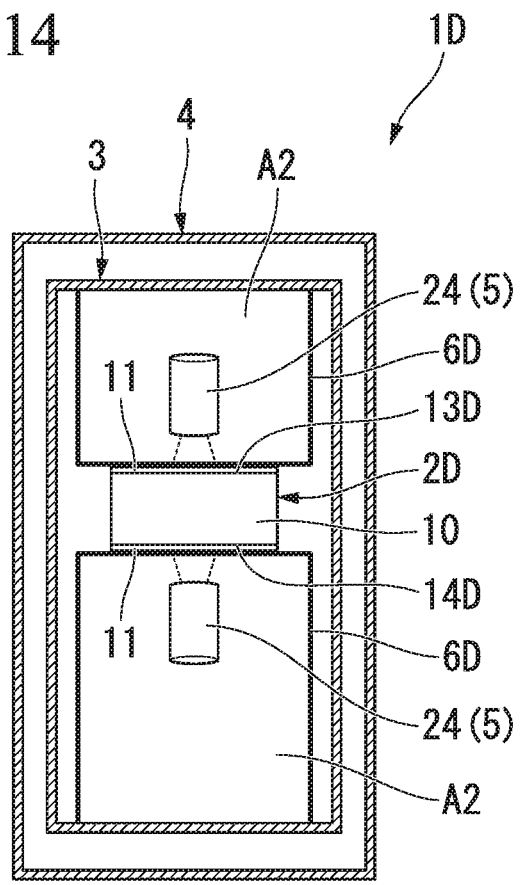
FIG. 14 is a sectional view taken along the line XIV-XIV in FIG. 13.

FIG. 13 is a diagram corresponding to FIG. 1 in the solid-state laser device in the fourth embodiment of the present invention. FIG. 14 is a sectional view taken along the line XIV-XIV in FIG. 13.

As shown in FIG. 13, a solid-state laser device 1D in this embodiment mainly includes a laser medium 2D, the inner container 3, the outer container 4, the cooling medium supply unit 5, and a cover section 6D.

The cover section 6D also serves as a support member (not shown) of the above-described first embodiment. That is, the laser medium 2D of the fourth embodiment is supported on the inner container 3 through the cover section 6D.

As shown in FIG. 13 and FIG. 14, the cover section 6D partitions a light-passing area (in FIG. 13, an area surrounded by a two-dot chain line) A1 from a cooling medium supply area A2 (in FIG. 13, an area excluding the area surrounded by a two-dot chain line) to which a cooling medium is supplied from the cooling medium supply unit 5. Therefore, the cover section 6D prevents the cooling medium from coming in contact with an incidence and emission surface 15D of the laser medium 2D.

As shown in FIG. 14, the cover section 6D forms a space (the cooling medium supply area A2) in which the nozzle 24 of the cooling medium supply unit 5 disposed above the upper surface 13D is accommodated together with an inner surface of the inner container 3 and an upper surface 13D of the laser medium 2D. In addition, the cover section 6D forms a space (the cooling medium supply area A2) in which the nozzle 24 of the cooling medium supply unit 5 disposed below the bottom surface 14D is accommodated together with the inner surface of the inner container 3 and a bottom surface 14D of the laser medium 2D.

For example, a sealing material (not shown) for preventing the cooling medium from leaking from the cooling medium supply area A2 to the light-passing area A1 may be provided at a part in which the cover section 6D and the laser medium 2D are bonded. The sealing material simply regulates movement of a liquid cooling medium and there is no need to ensure airtightness. The cover section 6D in this embodiment is bonded to the inner surface of the inner container 3 and a sealing material may be provided at the bonding part similarly.

According to the above-described fourth embodiment, since the laser medium 2D can be held by the cover section 6D, it is possible to further reduce the number of components compared with in a case in which the cover section 6D and the support member are individually provided.

Moreover, since the support member does not interfere with the provision of the cover section 6D, it is possible to increase a degree of freedom of disposition of the cover section 6D.

Fifth Embodiment

Next, a solid-state laser device of a fifth embodiment of the present invention will be described with reference to the drawing. The solid-state laser device of the fifth embodiment is different from the solid-state laser device of the above-described first embodiment in that it includes a trap part. Therefore, the same parts as in the first embodiment are denoted by the same reference numerals for description and redundant descriptions thereof are omitted.

Figure 15:
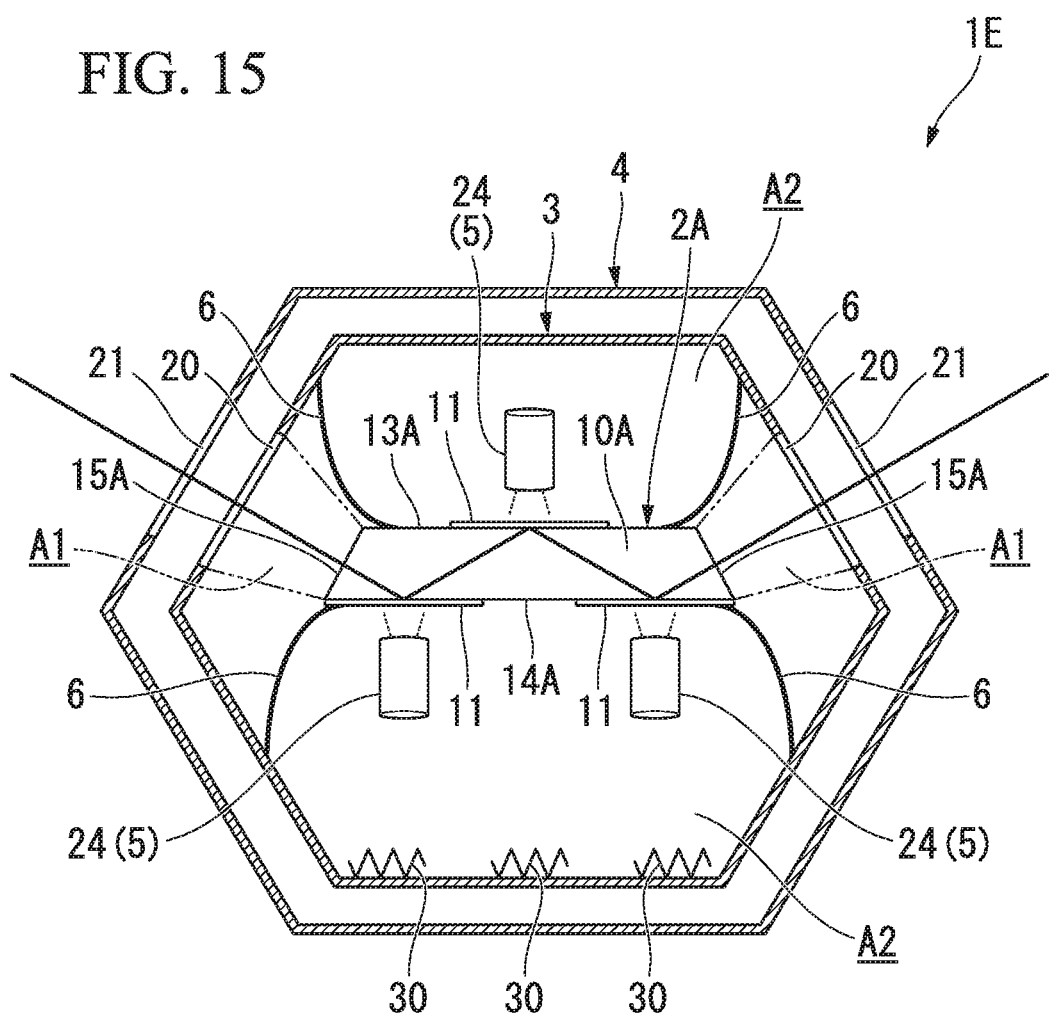
FIG. 15 is a diagram corresponding to FIG. 1 in a solid-state laser device in a fifth embodiment of the present invention.

FIG. 15 is a diagram corresponding to FIG. 1 in the solid-state laser device in the fifth embodiment of the present invention.

As shown in FIG. 15, a solid-state laser device 1E in this embodiment mainly includes the laser medium 2A, the inner container 3, the outer container 4, the cooling medium supply unit 5, the cover section 6, and a trap part 30. The laser medium 2A, the inner container 3, the outer container 4, the cooling medium supply unit 5, and the cover section 6 have the same configurations as those in the above-described first embodiment.

The trap part 30 collects a volatile component such as water contained in an atmosphere in the inner container 3. The trap part 30 can be disposed, for example, on a lower inner surface of the inner container 3 sufficiently away from the inner window 20.

The trap part 30 has a lower temperature than the surroundings and condenses a volatile component in contact with a low temperature part of the trap part 30. For example, a liquid generated when the volatile component is condensed may be discharged to the outside of the solid-state laser device 1E through a drain (not shown) or the like provided in the vicinity of the trap part 30. Since the trap part 30 is disposed sufficiently away from the inner window 20 and the laser medium 2A, hardly any heat is transferred from the trap part 30 to the inner window 20 and the laser medium 2A. That is, even if the trap part 30 has a low temperature, it is difficult to cool the inner window 20 and the laser medium 2A. For example, an insulating material or the like may be provided between the trap part 30 and the inner surface of the inner container 3 so that a large thermal resistance occurs between the trap part 30 and the inner surface of the inner container 3.

According to the above-described fifth embodiment, even if a small amount of volatile component and the like remain inside the inner container 3, the volatile component can be collected before it adheres to the inner window 20 and the laser medium 2A. As a result, it is possible to prevent the occurrence of condensation due to the volatile component and it is possible for blocking of excitation light and laser light to be further suppressed.

Sixth Embodiment

Next, a solid-state laser device of a sixth embodiment of the present invention will be described with reference to the drawing. The solid-state laser device of the sixth embodiment is different from the solid-state laser device of the above-described first embodiment in that it includes a heating unit. Therefore, the same parts as in the first embodiment are denoted by the same reference numerals for description and redundant descriptions thereof are omitted.

Figure 16:
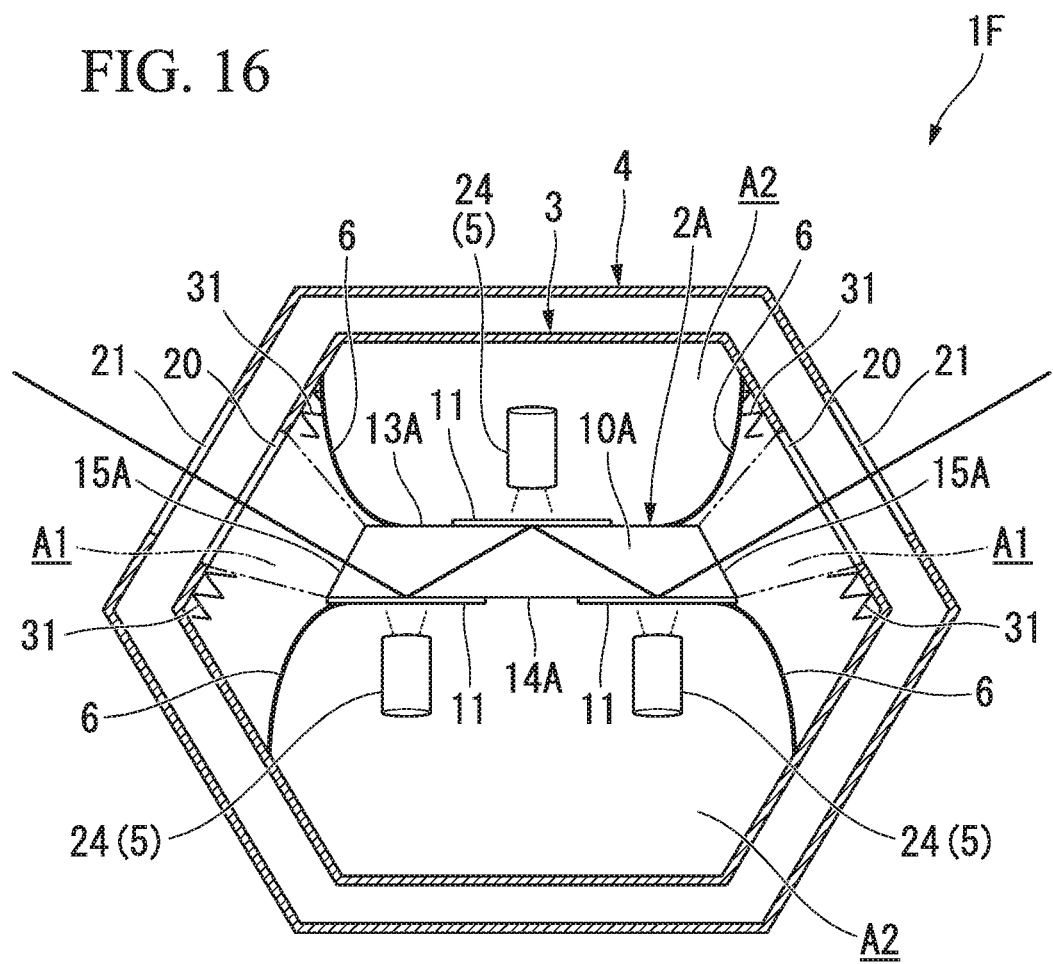
FIG. 16 is a diagram corresponding to FIG. 1 in a solid-state laser device in a sixth embodiment of the present invention.

FIG. 16 is a diagram corresponding to FIG. 1 in the solid-state laser device in the sixth embodiment of the present invention.

As shown in FIG. 16, a solid-state laser device 1F in this embodiment mainly includes the laser medium 2A, the inner container 3, the outer container 4, the cooling medium supply unit 5, the cover section 6, and a heating unit 31. The laser medium 2A, the inner container 3, the outer container 4, the cooling medium supply unit 5, and the cover section 6 have the same configurations as those in the above-described first embodiment.

The heating unit 31 can heat at least one of the inner window 20 (inner light-transmitting unit) and the incidence and emission surface 15A. The heating unit 31 in this embodiment is disposed around the inner window 20 within the inner surface of the inner container 3. For example, the heating unit 31 may be disposed to surround the inner window 20. The heating unit 31 can use various heating methods, for example, heating using a heater and heating using electromagnetic wave emission or warm air blowing.

The heating unit 31 is disposed in the light-passing area A1. Therefore, heat of the heating unit 31 is transferred not only to the inner window 20 but also to the incidence and emission surface 15A through an internal gas of the inner container 3, or the incidence and emission surface 15A is also heated by electromagnetic waves emitted from the heating unit 31. While a case in which both the inner window 20 and the incidence and emission surface 15A are heated has been described, only one of them may be heated.

According to the above-described sixth embodiment, since it is possible to increase the temperature of the inner window 20 and the incidence and emission surface 15A of the laser medium 2A, it is possible to condense the volatile component such as water in advance at a part with a relatively low temperature inside the inner container 3. As a result, it is possible to prevent condensation of the volatile component such as water on the laser medium 2A and the inner window 20.

The present invention is not limited to the above-described embodiments, and includes various modifications of the above-described embodiments without departing from the spirit and scope of the present invention. That is, specific shapes, configurations and the like exemplified in the embodiments are only examples, and can be appropriately changed.

For example, a case in which the laser mediums 2A and 2B are formed in a trapezoidal shape in a side view (in a top view in the laser medium 2C in the third embodiment) has been exemplified in the above-described embodiments and modified examples. However, the shape of the laser medium is not limited to the trapezoidal shape. For example, the laser medium may be a parallelogram in a side view (or in a top view). Further, the laser medium may have a rod shape, a thin disk shape, a slab shape, or a disk shape. Here, when the laser medium has a shape so that excitation light and laser light propagate in a horizontal plane, this is preferable because it is easy to handle.

Further, the shapes of the inner container 3 and the outer container 4 are examples and are not limited to the shapes shown in the above-described embodiments.

Figure 17:
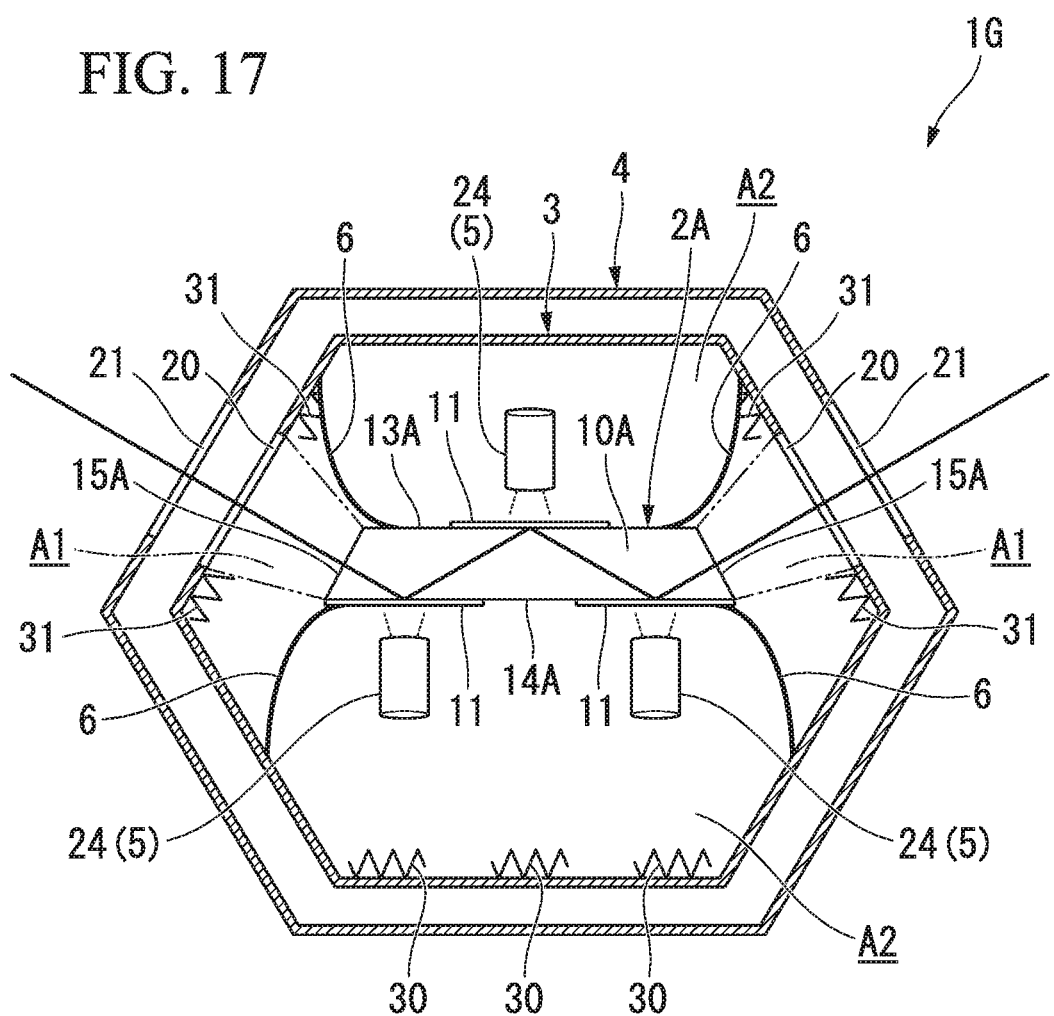
FIG. 17 is a diagram corresponding to FIG. 1 in a solid-state laser device of a modified example of the fifth embodiment.

FIG. 17 is a diagram corresponding to FIG. 1 in a solid-state laser device in a modified example of the fifth embodiment.

For example, as in a solid-state laser device 1G shown in FIG. 17, the trap part 30 of the fifth embodiment may be used in combination with the heating unit 31 of the sixth embodiment. In such a configuration, since the inner window 20 and the incidence and emission surface 15A are heated to reduce the occurrence of condensation and the trap part 30 can collect the volatile component, it is possible to prevent the occurrence of condensation more readily.

Further, combinations of the embodiments are not limited to the combination of the fifth embodiment and the sixth embodiment, and configurations of the above-described embodiments may be combined appropriately.

Moreover, although a case in which liquefied nitrogen is used as the cooling medium has been exemplified, a cooling medium other than liquefied nitrogen may be used.

Moreover, in the above-described first embodiment, in the pre-cooling process, a case in which the laser medium 2A is immersed in the cooling medium has been described. However, the pre-cooling process may be performed by spraying a cooling medium from the nozzle 24. In addition, the pre-cooling process may be performed using a low temperature gas.

Moreover, a case in which vacuum insulation is performed on the entire area between the inner container 3 and the outer container 4 has been exemplified in the above-described first embodiment. However, the vacuum insulation may be performed on only between the inner window 20 and the outer window 21, and the other part may have an insulation structure (for example, super insulation) other than vacuum insulation and a structure on which active insulation is not performed.

REFERENCE SIGNS LIST 1A, 1B, 1C, 1D, 1E, 1F, 1G Solid-state laser device
2A, 2B, 2C, 2D, 2E Laser medium
3 Inner container
4 Outer container
5 Cooling medium supply unit
6, 6D Cover section
10A, 10B Transparent part
11 Gain medium
12A, 12B, 12C Side surface
13A, 13B, 13C, 13D Upper surface
14 Bottom surface
15A, 15B, 15C, 15D Incidence and emission surface
20 Inner window
21 Outer window
22 Inner surface
23 Outer surface
24 Nozzle
25 Inner surface
30 Trap part
31 Heating unit
A1 Light-passing area
A2 Cooling medium supply area

The invention claimed is:

1. A solid-state laser device, comprising:
a laser medium including a first surface on which at least one of incidence and emission of light is to occur;
a gain medium which is disposed on a second surface of the laser medium, which is different from the first surface, and which is configured to totally reflect laser light that has entered the laser medium through the first surface;
an inner container in which the laser medium is accommodated and which includes an inner light-transmitting unit configured to transmit incident light incident on the first surface and emission light emitted from the first surface;
an outer container in which the inner container is accommodated, and which includes at least an outer light-transmitting unit at a part that faces the inner light-transmitting unit, the outer light-transmitting unit being configured to transmit the incident light and the emission light, and vacuum-insulated from the inner light-transmitting unit;
a cooling medium supply unit configured to supply a cooling medium inside the inner container so that the cooling medium comes in contact with the gain medium;
a cover section which is disposed in a space inside the inner container and by which the space is partitioned into a light-passing area between the first surface of the laser medium and the inner light-transmitting unit and a cooling medium supply area facing the second surface of the laser medium and in which the cooling medium supply unit is disposed, to prevent the cooling medium supplied from the cooling medium supply unit from coming in contact with the first surface of the laser medium, wherein the incident light and the emission light are capable of passing through the light-passing area, and the cooling medium supply unit is configured to supply the cooling medium to the second surface of the laser medium in the cooling medium supply area; and
a heating unit installed on the inner container in the light-passing area so as to be around the inner-light transmitting unit and which is capable of heating the inner light-transmitting unit.

2. The solid-state laser device according to claim 1, wherein the cover section includes a support part supporting the laser medium.

3. The solid-state laser device according to claim 1, further comprising
a trap part that is provided inside the inner container and configured to collect a volatile component contained in an atmosphere inside the inner container.

4. The solid-state laser device according to claim 1, wherein the inner container is a vacuum container that is capable of being vacuumized.

* * * * *